INVENTOR
FRANK S. PEARNE
BY
McNENNY, FARRINGTON, PEARNE & GORDON
ATTORNEYS

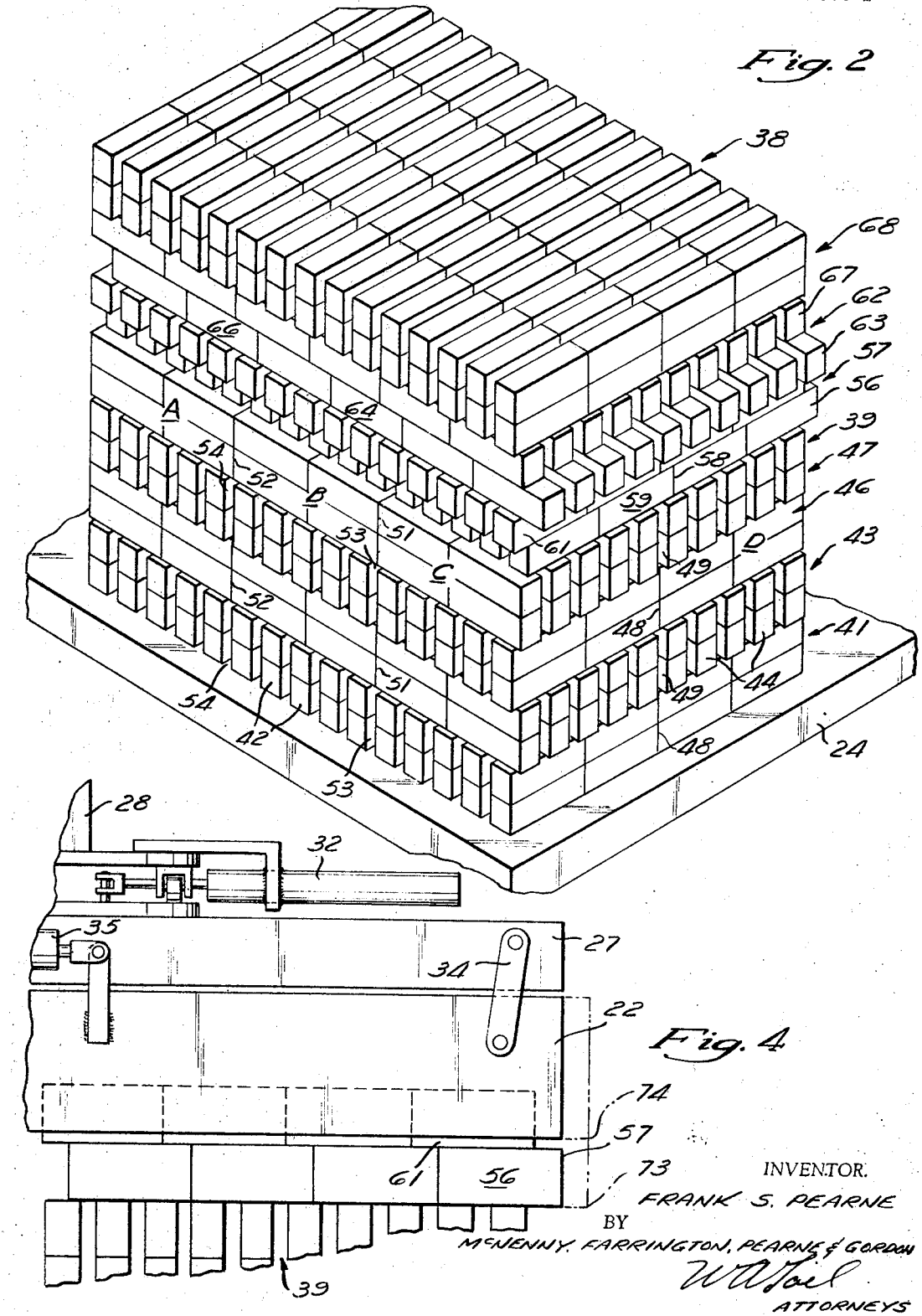

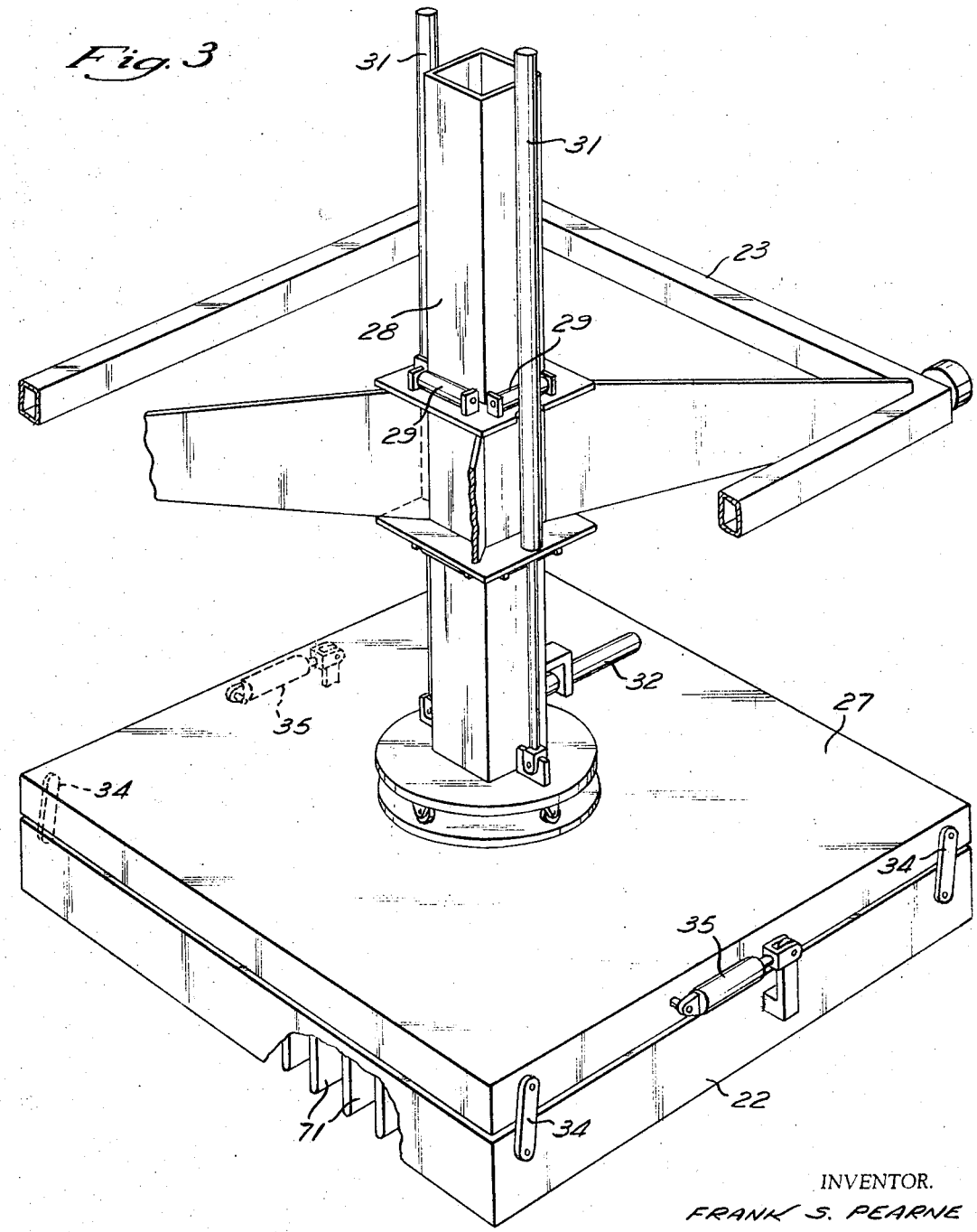

Nov. 18, 1969  F. S. PEARNE  3,478,896
APPARATUS FOR TYING BRICK STACKS
Filed June 6, 1967  4 Sheets-Sheet 2

INVENTOR.
FRANK S. PEARNE
BY
McNENNY, FARRINGTON, PEARNE & GORDON
ATTORNEYS

United States Patent Office 3,478,896
Patented Nov. 18, 1969

3,478,896
APPARATUS FOR TYING BRICK STACKS
Frank S. Pearne, San Gabriel, Calif., assignor to Pearne & Lacy Machine Company, Inc., Los Angeles, Calif., a corporation of California
Filed June 6, 1967, Ser. No. 644,024
Int. Cl. B65g 57/00, 57/16
U.S. Cl. 214—6                                6 Claims

ABSTRACT OF THE DISCLOSURE

A method and apparatus for stacking bricks on a kiln car in which selected rows in the stack are shifted to tie the stack together. A gripper frame operates to grip grids consisting of two superposed layers or tiers of brick each of which includes a plurality of spaced, parallel rows with each row formed of aligned and abutting bricks. The gripper is mounted on a movable carriage which operates repeatedly to move the gripper frame to a position over the kiln car to sequentially position grids thereon and thereby form a stack of grids on such car. The carriage operates to turn the gripper frame so that the superposed rows of each grid are perpendicular to the superposed rows of the adjacent grids in the stack. Tiering of the stack is provided by shifting the frame relative to the carriage so that lower rows in predetermined grids are shifted lengthwise before the lower rows are placed in the stack.

FIELD OF INVENTION

This invention relates generally to the manufacture of bricks and the like and more particularly to an automated brick hacking machine operable to stack bricks on a kiln car in a predetermined pattern with selected bricks positioned to tie the stack together.

BACKGROUND OF INVENTION

The co-pending application Serial No. 478,913, filed August 11, 1965, assigned to the assignee of the present application, discloses a fully automated brick cutter and hacker. This machine operates to automatically form bricks and subsequently positions such bricks in stacks on a kiln car. The stacks consist of grids each including spaced, parallel superposed rows of aligned and abutting bricks. The grids are turned perpendicular with respect to the adjacent grids so that the rows in each grid extend perpendicular to the rows of the adjacent grids.

SUMMARY OF INVENTION

The present invention is directed to a method and apparatus for stacking bricks on a kiln car, or the like, wherein selected rows such as all of the upper or lower rows of predetermined grids are shifted longitudinally to tie the entire stack together. With such tieing considerable improvement is provided in stack stability and less care is required in the handling of the kiln car. The apparatus incorporating this invention may be used in a combined cutter and hacker of the type illustrated in the co-pending application cited above or may be used in other compatible machines.

OBJECTS OF INVENTION

It is an important object of this invention to provide a novel and improved method and apparatus for stacking block-like articles on a platform wherein the pattern of bricks in the stack is arranged to tie the stack together for stabilization of the stack.

It is another important object of this invention to provide a novel and improved gripper transfer for forming stable stacks of block-like articles, such as bricks or the like, including means to shift selected rows of articles in the stack to provide tieing of the stack.

It is still another important object of this invention to provide a novel and improved brick cutter and hacker which automatically operates to form bricks and thereafter form stable stacks of such bricks on a kiln car.

Further objects and advantages will appear from the following description and drawings wherein—

FIGURE 2 is a fragmentary, perspective view of a stack of bricks stacked in accordance with a method of this invention wherein selected rows of bricks are shifted longitudinally of the selected rows to tie the stack together;

FIGURE 3 is an enlarged fragmentary, perspective view of a first embodiment of gripper frame and supporting carriage incorporating this invention, illustrated with parts broken away for purposes of illustration;

FIGURE 4 is an enlarged, fragmentary, side elevation of the gripper frame of FIGURE 3 illustrating the manner in which the frame shifts to provide the tieing of the stack; and, FIGURE 5 is an enlarged, fragmentary, side elevation of a modified form of gripper frame shifting apparatus.

Figure 1:
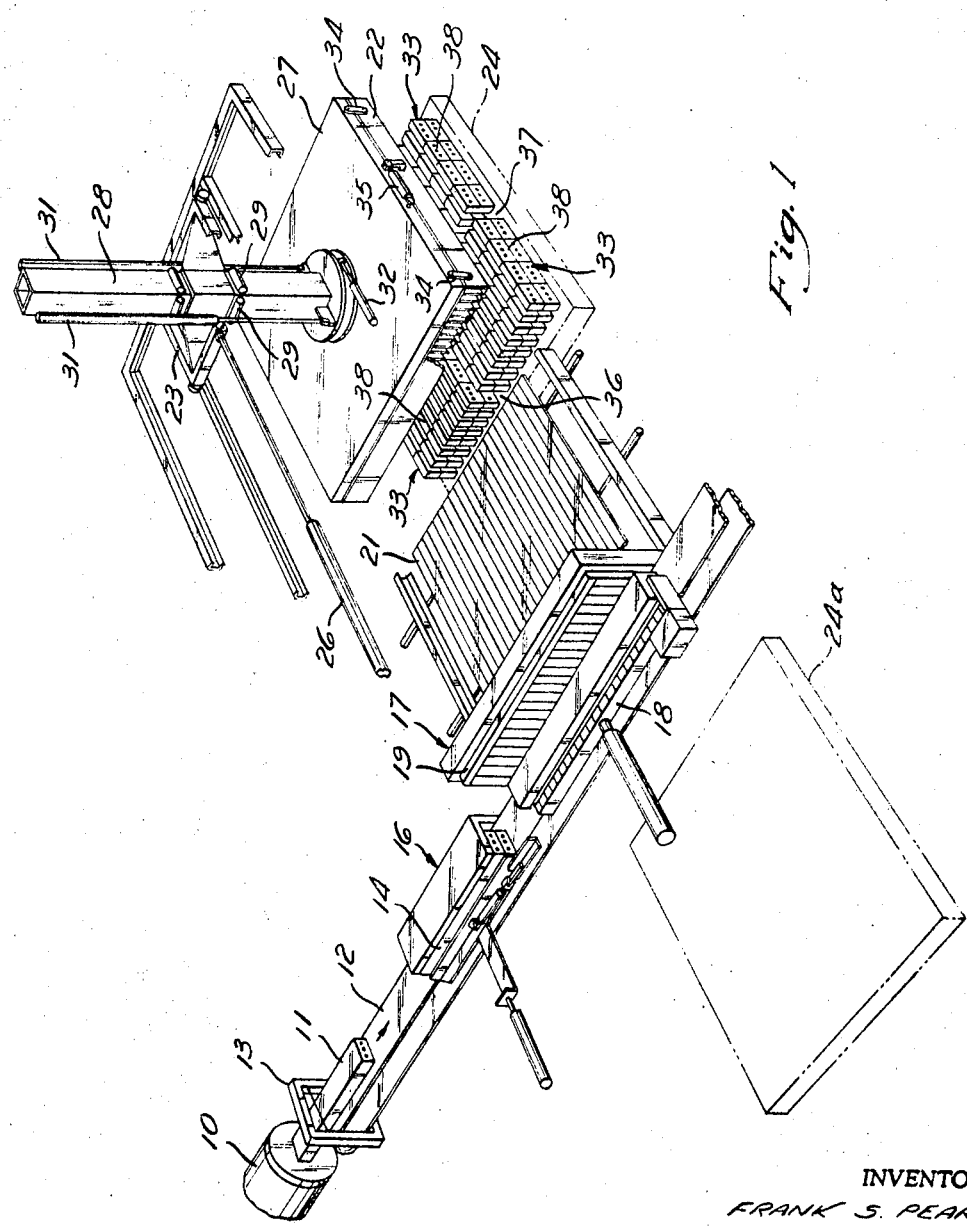
FIGURE 1 is a schematic, perspective view of a complete cutter and hacker incorporating this invention with parts removed for purposes of illustration.

FIGURE 1 is a schematic illustration of a combined machine which automatically operates to form brick and stack the brick on a kiln car so that it may be fired. A pug mill 10 continuously extrudes a column 11 of unfired brick material onto an off-bearing belt 12. The column 11 has the cross-section required for the finished brick. The column 11 is cut by a bow cutter 13 into slugs 14 of predetermined length. The speed of the belt 12 is faster than the speed of extrusion, so spaces are provided between adjacent slugs. An inverter 16 automatically operates to invert alternate slugs 14 and position such inverted slugs on top of the subsequent slug. All subsequent operations are performed simultaneously on two vertically aligned slugs.

From the inverter 16 the slugs are carried along the off-bearing belt 12 to a cutter station 17. At the cutter station 17 the pairs of slugs 14 are pushed by a pusher 18 through a cutter frame 19 onto a spreader table 21. The pairs of slugs are cut by the cutter frame 19 into individual bricks, thus producing superposed lines of abutting bricks wherein each superposed line consists of a plurality of pairs of bricks. Positioning means (not illustrated) operate to position groups of superposed lines on the spreader table 21 with the pairs of bricks in each superposed line resting on a separate spreader board. The spreader table then operates to separate the pairs of brick in each superposed line a predetermined distance to form grids 33 each consisting of a plurality of superposed rows of endwise, abutting, pairs of brick wherein the superposed rows are spaced from, and are substantially parallel to the adjacent rows in the grid. Therefore each grid consists of spaced parallel upper rows and lower rows. The illustrated machine forms four similar grids 33 on the spreader table which are simultaneously moved to the kiln car.

A gripper frame 22 is mounted on a carriage 23 for movement between a pick-up position over the spreader table 21 and a delivery position over a kiln car 24. A subsequent kiln car 24a is moved to the stacking position when the car 24 is fully loaded. Power for moving the carriage 23 back and forth between its two positions is provided by an actuator 26. The gripper frame 22 is supported by a carrier plate 27 which is in turn mounted on a vertically movable support column 28 which extends through spaced guide bearings 29 on the carriage 23. Power for raising and lowering the column 28 is provided by actuators 31. The carrier plate 27 is rotatable relative to the column 28 through a ninety degree angle by an actuator 32, so that the frame 22 can be turned to a position alternate grids 33 on the kiln car 24 so that the rows of brick in each grid extend substantially perpendicular to the rows of brick in the adjacent grids.

The gripper transfer 22 is connected to the carrier plate 27 by a power operated shifting mechanism so that the lower rows of predetermined grids can be shifted longitudinally to provide tieing of the stacks formed on the kiln car 24. The shifting mechanism includes pivoted support links 34 at each corner of the transfer 22 and similar actuators 35 on opposite sides of the transfer. When the actuators 35 are retracted the transfer 22 is directly under the carrier plate 27 and when the actuators 35 are extended the transfer 22 is shifted relative to the carrier plate to a shifted position. Reference should be made to the co-pending application cited above for a detailed description of the general structure and operation of the various subassemblies illustrated in FIGURE 1.

The grids 33 illustrated in FIGURE 1 are separated laterally of the rows by a central space 36 of greater width than the spacing between adjacent rows and are lengthwise separated by a space 37 extending across the kiln car 24. The four grids form separate stacks 38 on the kiln car and may include any desired number and length of rows compatible with the size of the kiln cars. For example, the grids illustrated in FIGURE 1 each include eight superposed rows four bricks long. Generally, kiln cars are longer than they are wide, so the four stacks 38 are generally rectangular in shape having a length exceeding their width. If the grids are rectangular rather than square the machine is arranged to form slugs of a first length to form the grids having rows lengthwise of the car and then form slugs having a different length and a different number of bricks in each row for the grids wherein the rows extend laterally of the kiln car. Here again, the apparatus and method for utilizing a single machine to cut and handle slugs of different lengths is disclosed in detail in the co-pending application cited above.

FIGURE 2 illustrates a single stack 39 positioned on a kiln car 24. It should be recognized that the stack 39 is only representative of the size and shape of a stack which may be formed according to a method and apparatus incorporating this invention. A single car 24 may be loaded with a single stack 39 or with two or more stacks symmetrically positioned on the car as illustrated in FIGURE 1.

The stack illustrated in FIGURE 2 is formed of superposed pairs of brick in the same general manner as the stack illustrated in FIGURE 1. However, the number of bricks in the rows and the number of rows in the grid are different than the grid illustrated in FIGURE 1. In this stack the lowermost grid 41 which rests directly on the kiln car 24 includes fifteen superposed rows 42 which are spaced from each other and substantially parallel to each other. Each superposed row 42 is four bricks long and two bricks high. The next grid 43 is formed of ten superposed rows 44 with each superposed row six bricks long and two bricks high. The rows in the grid 43 are perpendicular to the rows in the grid 41. The third grid 46 is similar to the first grid 41 and is positioned directly over the first grid 41. The fourth grid 47 is similar to the second grid 43 and is positioned directly over the second grid 43 while resting on the third grid 46.

It should be noted that the abutting ends at 48 in the grids 41 and 46 fall in alignment with a space 49 between the rows of the grids 43 and 47. Therefore, there is no tieing within the grids 41 through 47 of the bricks located on opposite sides of the abutting end faces 48. Similarly, the abutting end faces at 51 and 52 in the grids 43 and 47 fall in alignment with spaces 53 and 54, respectively, in the grids 41 and 46. Therefore, there is no tieing of the bricks in the grids 41 through 47 on either side of the abutting faces 51 and 52. In effect the grids 41 through 47 constitute six separate stacks which abut but are not tied together. Four of these stacks appear in FIGURE 2, namely the stacks A, B, C, and D. It should be recognized that two additional stacks exist along the back side which is not visible in FIGURE 2.

In order to tie the stacks C and D together and to tie the stacks A and B to the hidden stacks directly behind them, the lower rows of the grid 57 are shifted lengthwise relative to the upper rows so that the abutting end faces at 58 are shifted from the space 49 and a single brick 59 extends across the space 49 of the grid 47. Corresponding bricks in each lower row 56 of the grid 57 are also shifted so that a full tieing of the stacks A, B and C to the stacks immediately therebehind occurs. The upper rows 61 of the grid 57 are not shifted in the illustrated embodiment of this invention, so the upper rows are positioned vertically above the rows of the grid 46 and provide a proper base for all of the rows of the next higher grid 62.

Tieing in the other direction is provided by shifting the lower rows 63 of the grid 62 lengthwise relative to the upper rows 67. Therefore, the bricks 64 and 66 are over the spaces 53 and 54, respectively, and tie the stacks A, B and C together and also tie the stack D with the two back stacks. With this method of stacking all of the stacks are tied together by the use of the grids 57 and 62 so a unitary stable stack 39 is provided.

The upper rows 67 are not shifted but rather are positioned directly above the rows of the corresponding grids 47 and 41 so that a subsequent grid 68 can be stacked in the normal manner. It should be understood that additional grids can be positioned on the stack in the manner of the grids 43, 46 and 47 and that additional cross tieing can be provided at higher predetermined grids in the stack. Because the stacks are tied together a high degree of stability is provided and danger of the stack falling does not occur even when the kiln car is moved in an abrupt manner. Careful handling of the kiln car is not required when stacking according to this invention is utilized.

FIGURES 3 and 4 illustrate one embodiment of a transfer gripper incorporating this invention which may be used to form the stacks of the type illustrated in FIGURE 2. The gripper transfer is provided with spaced parallel inflatable grippers 71 of the type disclosed in the co-pending application cited above. These grippers are spaced to straddle each row of brick resting on the spreader table 21. When grids are to be transferred the gripper frame 22 is lowered over the bricks located on the spreader table and the grippers 71 are inflated to grip each brick on the table. The actuators 31 are then operated to raise the gripper frame 22 with the grid of bricks carried thereby so that the bricks are at a level at least as high as the topmost grid on the kiln car 24. The actuator 26 then extends to position the gripper frame 22 over the kiln car. The actuator 32 is operated to turn the gripper frame through ninety degrees in the event that turning is required to position the grid in the proper direction on the kiln car. The actuators 31 are then extended until the bricks are lowered onto the stack being formed on the kiln car.

In the event that shifting is required to provide the tieing as discussed above, for example in the setting of the grid 57, actuators 35 are extended, before lowering, to cause the gripper frame 22 to move to the right relative to the carrier plate 27 to the phantom position (illustrated in FIGURE 4). At this point in the operation the lower corner of the gripper frame is at the phantom position 73. The grippers 71 are then deflated and the grid rests on the top of the grid 39 with both the lower and upper rows 56 and 61 shifted to the right.

The actuators 31 are then retracted to raise the gripper frame to the phantom position wherein the lower righthand corner, as viewed in FIGURE 4, is at the point 74. The grippers 71 are then re-inflated to grip the upper rows 61 and the actuators 31 are retracted slightly to raise the upper lower rows 61 off of the rows 56. The actuators 35 are then retracted to shift the upper rows 61 back to their normal position as illustrated in FIGURE 4. The frame is then lowered and the grippers are again deflated to release the upper rows 61. The various actuators are then operated to return the frame to the spreader table to pick up subsequent grids. It should be understood that the positioning of the grid 62 follows the same procedure with the exception that the grid is positioned at right angles to the grid 57 by the actuator 32. Also, it should be understood that when the grids 41, 43, 46, 47 and 68 are positioned on the stack, the actuators 35 are retained in the retracted position in which the gripper frame 22 is immediately below the carrier plate 27.

Figure 5:
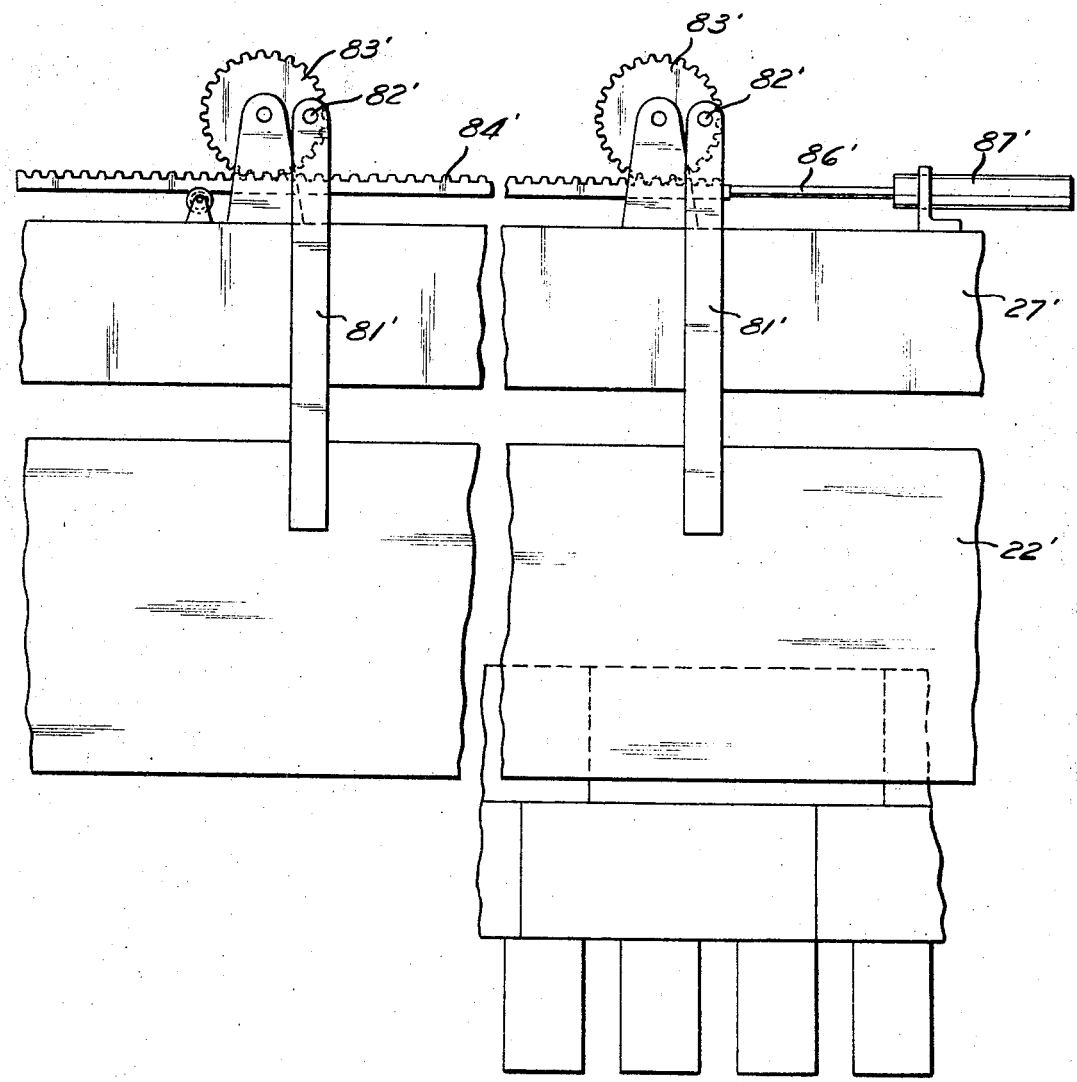

FIGURE 5 illustrates a second embodiment for supporting the gripper frame on the carrier plate. In this embodiment similar reference numerals will be used for corresponding elements and assemblies with a prime (') added to indicate that reference is made to the second embodiment. The carrier plate 27' is supported by a vertically movable column of the same type illustrated in the first embodiment. However, the gripper frame 22' in this instance is supported by parallel arms 81' which are anchored at their lower ends on the gripper frame and are pivotally connected at their upper ends to pivots 82' on gear wheels 83'. Similar bars 81' are provided at the far side of the carriage plate 27'.

The two gear wheels 83' are synchronized and driven by a gear rack 84' mounted on the piston 86' of an actuator 87'. When the piston 86' is in one extreme of its movement the two gear wheels are in the position illustrated with the pivots 82' to the right of the wheel pivots. Retraction of the piston 86' causes the two gear wheels 83' to rotate in a counterclockwise direction through one-hundred and eighty degrees until the pivots 82' are to the left of the wheel pivots.

With this embodiment shifting is provided by operating the actuator 87' to shift the gripper frame 22' relative to the carrier plate 27' before the transfer is lowered to the stacking position. The actuators 31 then lower the gripper frame until the grid carried by the gripper frame is positioned on the stack. The actuators 31 are then raised a distance equal to the height of one brick row and re-gripping occurs. The actuator 87' is then operated to shift the frame back to its normal position. This shifting movement occurs through an arc with the first portion of the movement vertically upward and the last portion of the movement vertically downward. Consequently, it is not necessary to operate the actuators 31 to raise the frame slightly for shifting movement, nor is it necessary to then extend the actuators 31 to reset the upper rows of the shifted grid.

With a method and apparatus incorporating the present invention it is possible to rapidly stack bricks on a kiln car, or the like, for burning or firing of the bricks. The resulting stack can be relatively high while still providing all the stability necessary to eliminate the need of careful handling of the kiln car.

Although preferred embodiments of this invention are illustrated it is to be understood that various modifications and rearrangements of parts may be resorted to without departing from the scope of the invention.

I claim:

1. An apparatus for stacking grids of block-like articles in which each grid includes a plurality of spaced substantially parallel rows of aligned abutting articles comprising a gripper transfer operable to simultaneously grip and support the articles in a grid, power means supporting said gripper transfer for cyclic movement between a pickup position in which said gripper transfer grips a grid and a normal stacking position in which said transfer stacks such grid, said power means operating to shift said transfer from said normal stacking position to a shifted stacking position when predetermined grids are transferred so that at least selected rows in said predetermined grid are shifted to tie the stack together, said power means includes a carrier movable between a pickup position and a stacking position and shift means connecting said gripper transfer to said carrier, said shift means being operable to move said gripper transfer relative to said carrier between a normal position and a shifted position, said shift means moves said transfer relative to said carrier along an arcuate path which is substantially vertical at its ends and is substantially horizontal intermediate its ends, said shift means includes a plurality of similar linkages each including an oscillating member and a support element eccentrically pivoted on the associated oscillating member, and drive means operating said linkages in synchronization.

2. An apparatus for stacking grids of block-like articles in which each grid includes two superposed layers or tiers, each tier being composed of a plurality of spaced substantially parallel rows of aligned abutting articles comprising a carriage movable from a gripping position to a stacking position, first power means connected to move said carriage between said gripping position and said stacking position, a gripper frame mounted on said carriage for horizontal shifting movement relative to the carriage between a normal position and a shifted position, second power means connected to move said gripper frame with respect to said carriage between said normal position and said shifted position, a plurality of grippers on said frame operable to grip both the upper and lower rows of a grid at the same time when said carriage is in said gripping position and to release said rows when said carriage is in said stacking position, third power means connected to operate said grippers, said second power means which shift the gripper frame relative to said carriage being independent from the third power means which operate said grippers, said grippers, said first power means and said third power means normally operating to release said grids in a normal position, said second power means, said third power means and said grippers being operable to automatically grip articles then shift all of the grippers and articles gripped thereby from said normal position to a shifted position and release said gripped articles to tie the stack.

3. An apparatus as set forth in claim 2 wherein said shifted position is in a direction from said normal position substantially parallel to the lengthwise direction of rows supported by said transfer.

4. An apparatus as set forth in claim 3 wherein said third power means moves said gripper frame relative to said carrier along a path which is substantially vertical at its ends and is substantially horizontal intermediate its ends.

5. An apparatus as set forth in claim 4 wherein said path is arcurate.

6. An apparatus as set forth in claim 5 wherein said articles are unfired brick, and said apparatus includes means to form said brick and arrange them in grids.

References Cited

UNITED STATES PATENTS

| | | |
|---|---|---|
| 2,710,696 | 6/1955 | Fontaine et al. |
| 2,955,717 | 10/1960 | Segur et al. |
| 3,128,890 | 4/1964 | Paisley. |
| 3,260,379 | 7/1966 | Bason. |
| 3,262,594 | 7/1966 | Teago. |
| 3,270,897 | 9/1966 | Lingl. |
| 3,302,967 | 2/1967 | Harris et al. _____ 294—81 X |

ALBERT J. MAKAY, Primary Examiner

ROBERT J. SPAR, Assistant Examiner

UNITED STATES PATENT OFFICE
CERTIFICATE OF CORRECTION

Patent No. 3,478,896                                    November 18, 1969

Frank S. Pearne

It is certified that error appears in the above identified patent and that said Letters Patent are hereby corrected as shown below:

Column 3, line 4, after "to" cancel -- a --. Column 5, line 4, after "upper" cancel -- lower --. Column 5, line 4, after "the", first occurrence, insert -- lower --. Column 6, line 51, claim reference numeral "3" should read -- 2 --; line 58, claim reference numeral "5" should read -- 2 --.

Signed and sealed this 28th day of April 1970.

(SEAL)
Attest:

Edward M. Fletcher, Jr.                          WILLIAM E. SCHUYLER, JR.
Attesting Officer                                      Commissioner of Patents